May 6, 1947.  T. S. CARSWELL  2,420,284
PROCESS FOR CUTTING POLYMERIZED VINYL AROMATIC MATERIAL
Filed March 30, 1944
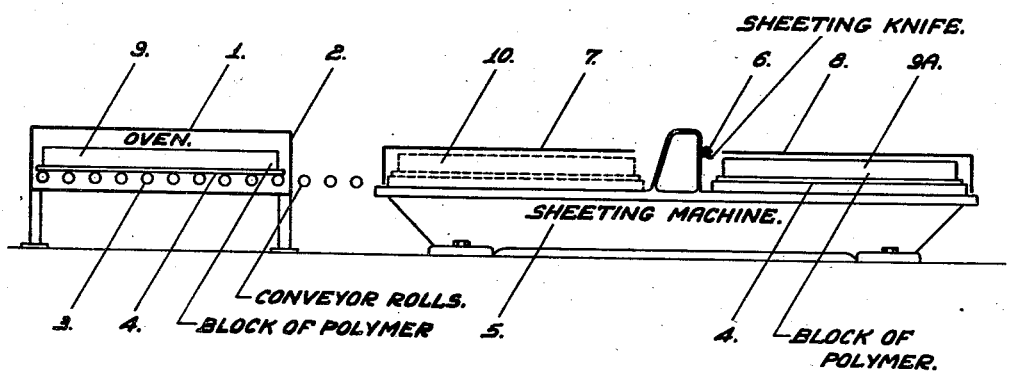
INVENTOR
THOMAS S. CARSWELL.
BY Reuben Schmidt
His ATTORNEY

UNITED STATES PATENT OFFICE 2,420,284

PROCESS FOR CUTTING POLYMERIZED VINYL AROMATIC MATERIAL

Thomas S. Carswell, Longmeadow, Mass., assignor to Monsanto Chemical Company, St. Louis, Mo., a corporation of Delaware Application March 30, 1944, Serial No. 528,669

6 Claims. (Cl. 18—48)

This invention relates to an improved process for cutting polymerized masses of vinyl aromatic materials and more particularly, for cutting blocks of polymerized vinyl aromatic materials into sheets.

Such vinyl aromatic materials as styrene and other aromatic materials containing as a substituent a single vinyl

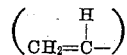

or substituted vinyl (CH=C<) radical attached to an aromatic nucleus are, in general, readily polymerized under suitable conditions to solid polymeric products. In some instances, such products, after comminution, are employed as molding compositions. In other instances, particularly in preparing articles of such a shape and/or size that such a molding operation is not feasible, it has been suggested that the vinyl aromatic material be polymerized in a suitable mold, so that the polymeric product be obtained directly in the desired shape. However, certain difficulties are inherent in such a process which in the case of certain shapes, for example, thin sheets, makes its employment impractical.

It is an object of this invention to provide a process for cutting masses of thermoplastic polymerized vinyl aromatic materials, as for example, into sheets. A particular object is to provide a process for cutting blocks of polymerized vinyl aromatic materials into sheets.

According to the present invention a solid mass of thermoplastic polymerized vinyl aromatic material, for example, polystyrene, may be readily cut with a sharp knife into articles with desirable characteristics, provided the polymeric mass is maintained in the proper temperature range. Hitherto, while it has been known that thermoplastic polymerized vinyl aromatic materials, for example, polystyrene, softened with a rise in temperature, it has not been known that there was a critical temperature range for cutting masses of such materials into desired shapes, for example, into sheets. The critical temperature range, hereinafter called the transition temperature range, at which thermoplastic polymerized vinyl aromatic materials, for example, polystyrene, can be readily cut, has been found to be the temperature range in which the thermoplastic polymeric material is intermediate in physical characteristics between an essentially form-stable solid material and one that is essentially rubbery in nature. Thus, in this temperature range internal strains are relieved, strength drops rapidly, high elasticity sets in and the material is characterized by excessive cold flow. Said thermoplastic polymeric material, in its intermediate condition suitable for sheeting, is conveniently obtained by heating the form-stable solid thermoplastic polymeric material under increasing temperature conditions until said intermediate condition is obtained. In the transition temperature range the polymeric material is also characterized by a sharp increase in per cent ultimate elongation with increasing temperature.

The thermoplastic polymeric vinyl aromatic materials contemplated by the present invention may be prepared by polymerizing vinyl aromatic compounds, i. e. aromatic compounds having attached to an aromatic nucleus thereof, a single polymerizable vinyl

or substituted vinyl (CH$_2$=C<) group. In particular, thermoplastic polymerized vinyl benzene compounds are contemplated, i. e. vinyl aromatic materials having a single benzene ring. Examples of vinyl aromatic compounds are styrene, ortho-methyl-styrene, para-methyl-styrene, para-phenyl-styrene, ortho-chloro-styrene, para-chloro-styrene, ortho-bromo-styrene, dichloro-styrenes, such as 2,5-dichlorostyrene, para-isopropyl-styrene, alpha-chloro-styrene, alpha-methyl-styrene, vinyl naphthalene, and the like. When desired, mixtures of vinyl aromatic materials such as those mentioned above may be employed or mixtures with other materials copolymerizable therewith wherein the vinyl aromatic materials predominate, for example, mixtures containing more than 50% of styrene and the balance vinyl chloride, vinyl acetate, methyl acrylate, maleic anhydride or the like.

The accompanying drawing illustrates diagrammatically means by which the present invention may be practiced, but it is also to be expressly understood that the drawing is for the purpose of illustration only and is not to be considered as limiting the invention or the apparatus which may be used therewith. The figure in the drawing is a side elevational view of apparatus which may be used in the preparation of sheets of polymerized vinyl aromatic material. This apparatus comprises an oven 1 having a door 2 and conveyor rolls 3 by which the polymer block mounted on base plate 4 is transferred back to the sheeting machine 5 which has a sheeting knife as shown at 6. The oven may be heated by steam rolls, infra-red ray lamps or other suitable means not shown. At 7 and 8 are represented means for preventing the heated vinyl aromatic material polymer from cooling excessively during the sheeting operation. Such means which are represented as hoods in the drawing may comprise heat insulating material supplemented by steam coils, infra-red ray lamps and the like.

A block of polymerized vinyl aromatic material is shown at 9 in the process of being heated to the desired temperature for sheeting. At 9a is shown a block of polymerized vinyl aromatic material which has been brought to the desired temperature for sheeting and is in position for sheeting. The base plate 4 on which the polymerized vinyl aromatic material is mounted, is fastened securely to the reciprocating base of the sheeting machine by means not shown. At 10 is shown in dotted lines the position of block 9a after a sheet has been cut off and before return to its original position, 9a.

The following examples are illustrative of the process of the present invention but are not to be construed as limitative thereof.

Example I

A block of polymerized styrene substantially 7 inches long, 5 inches wide and 2 inches thick is prepared by polymerizing styrene in a suitable container under such conditions that a 10% solution in toluene of the resulting polymer possesses a viscosity of substantially 200 centipoises at 25° C. In order to illustrate the increase in per cent ultimate elongation in the transition temperature range of the above polystyrene block, dumbbell-shaped test bars with their necked-down portions ¼ inch square, are injection molded from comminuted polystyrene polymerized under the same conditions as the above-described block. These bars are then tested at temperatures varying from —25° C. to in excess of 120° C. for per cent elongation at the breaking point on a Tinius-Olsen mechanically driven pendulum type weighing machine with a constant rate of jaw separation of 1.0 inch per minute. These tests show a per cent ultimate elongation of substantially 3% up to a temperature of about 80 to 85° C. whereupon the per cent ultimate elongation starts to increase at such rate that the elongation at 100° C. is substantially 150%. Above substantially 120° C., the polymer becomes substantially soft and rubbery. The transition temperature range of substantially 80 to 120° C. has been found to be the broadest temperature range at which the polystyrene block is advantageously cut into sheets. Preferably, according to this invention, temperatures between substantially 90° C. and 110° C. are employed in sheeting polystyrene according to the present process.

The polystyrene block, described above, is suitably heated and is then transferred to a sheeting apparatus of the well-known type for sheeting cellulose derivative plastic blocks and cut into a plurality of sheets of varying thicknesses while being maintained at the preferred temperatures. Thus, at a temperature of substantially 95–100° C. sheets varying from 0.050 to 0.250 inch respectively in thickness and which are smooth and substantially uniform in thickness have been obtained. These sheets are now suitable for fabrication by well-known methods for various uses. If desirable, the sheets may be polished by methods employed for polishing cellulose derivative plastic sheets comprising pressing the sheets between highly polished chromium plated steel plates for 10 minutes at a pressure and temperature corresponding to 15 pounds per square inch steam pressure. The sheets so treated possess a high degree of polish.

In contrast to the process set forth above, when an attempt is made to sheet a similar block of polystyrene at a temperature below 80° C. the sheets are, in general, practically worthless. Thus, the mass tends to chip and crumble and the resulting sheets are either so rough as to destroy their utility for most purposes or, in attempting to prepare thin sheets, the polystyrene tends to simply flake off in small sections. Furthermore, it is unexpectedly found that sheeting a similar block of polystyrene at temperatures above 120° C. also results in the production of sheets with undesirable characteristics. Thus, at these temperatures, the knife tends to dig into the mass at irregular intervals, not only producing a sheet of uneven thickness, but leaving an uneven surface on the remaining portion of the block.

Example II

Example I is repeated except that polymerized 2,5-dichlorostyrene is used in place of polymerized styrene.

The polymeric 2,5-dichlorostyrene possesses such a degree of polymerization that a solution of 2 grams of polymer in 1 liter of toluene has a specific viscosity of substantially 0.285 at 25° C. when determined with an Ostwald type viscosimeter. A block of polymeric 2,5-dichlorostyrene is heated to a temperature of substantially 135–140° C. and cut into a plurality of sheets in the manner set forth in Example I. The resulting sheets are smooth and substantially uniform in thickness. They are suitable for further fabrication by methods indicated in Example I.

The temperature at which polymeric 2,5-dichlorostyrene may be sheeted or otherwise cut into desired configurations extends through the transition temperature range for this material. The transition temperature range for polymeric 2,5-dichlorostyrene, determined as set forth in Example I, is from substantially 120° C. to substantially 160° C. Preferably, temperatures between substantially 130° C. and 150° C. are employed in sheeting blocks of polymeric 2,5-dichlorostyrene.

This invention is not limited as to any theories as to its mode of operations and rests upon the unexpected and valuable discoverey that the critical range for cutting thermoplastic polymeric vinyl aromatic material approximates that at which the polymeric mass undergoes a rapid transition in certain properties. In the case of polystyrene having degrees of polymerization corresponding to viscosities of 10% toluene solutions of 50–200 centipoises at 25° C. this transition temperature range and most desirable temperature range in which to cut blocks of polystyrene into sheets approximates 80–120° C. as hereinbefore indicated.

This invention is not limited as to the degree of polymerization of the polymeric masses or to the apparatus for cutting such masses. Furthermore, this invention is not limited to the preparation of sheets and may be employed in cutting articles of various configurations from masses of polymerized vinyl aromatic materials, such as polystyrene.

It is to be understood that the above description is given by way of illustration only, and not of limitation, and that deviations are possible within the spirit of the invention.

This application is a continuation-in-part of my co-pending application Serial Number 398,733, filed June 19, 1941.

What is claimed is:

1. A process for severing sheets from a block of a polymerized thermoplastic vinyl benzene material which comprises heating said block to the transition temperature range of the thermoplastic polymerized vinyl benzene material and then slicing sheets from said block with a knife.

2. A process for sheeting a block of a thermoplastic polymerized vinyl benzene material which comprises heating said block to the transition temperature range of the thermoplastic polymerized vinyl benzene material and then cutting said sheets from said block while maintaining said block in said transition temperature range.

3. A process for severing sheets from a block of polystyrene which comprises heating said block to substantially 80–120° C. and then slicing sheets from said block with a knife.

4. A process for sheeting a block of polystyrene which comprises heating said block to substantially 90–110° C. and then cutting sheets from said block while maintaining said block at substantially 90–110° C.

5. A process for severing sheets from a block of a polymerized thermoplastic vinyl aromatic material which comprises heating said block to the transition temperature range of the thermoplastic polymerized vinyl aromatic material and then slicing sheets from said block with a knife.

6. A process for sheeting a block of thermoplastic vinyl aromatic material which comprises heating said block to the transition temperature range of the thermoplastic polymerized vinyl aromatic material and then cutting said sheets from said block while maintaining said block in said transition temperature range.

THOMAS S. CARSWELL.

REFERENCES CITED

The following references are of record in the file of this patent:

UNITED STATES PATENTS

| Number | Name | Date |
| --- | --- | --- |
| 2,319,040 | Conklin | May 11, 1943 |
| 2,095,119 | Beal | Oct. 5, 1937 |
| 2,175,053 | Ferngren | Oct. 3, 1939 |
| 1,683,402 | Ostromislencky | Sept. 4, 1928 |

OTHER REFERENCES

Wiley, "Transition Temperature and Cubical Expansion of Plastic Material," Ind. and Eng. Chem., Sept. 1942, pages 1052–1056, 18055 Pub.

Getman and Daniels, "Outlines of Theoretical Chemistry," sixth edition 1937, John Wiley and Sons New York, pages 60 and 296. (Copy in Div. 15.)